US 7,111,779 B2

(12) United States Patent
Horikawa et al.

(10) Patent No.: US 7,111,779 B2
(45) Date of Patent: Sep. 26, 2006

(54) SYSTEM, METHOD, AND PROGRAM FOR GENERATING TRANSACTION PROFILE FOR MEASURING AND ANALYZING COMPUTER SYSTEM PERFORMANCE

(75) Inventors: Takashi Horikawa, Tokyo (JP); Toshiaki Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 51 days.

(21) Appl. No.: 11/044,032

(22) Filed: Jan. 28, 2005

(65) Prior Publication Data

US 2005/0167486 A1 Aug. 4, 2005

(30) Foreign Application Priority Data

Jan. 30, 2004 (JP) ............................. 2004-023304

(51) Int. Cl.
*G06K 5/00* (2006.01)
(52) U.S. Cl. ...................................... 235/380; 235/382
(58) Field of Classification Search ................ 235/375, 235/380, 382, 382.5
See application file for complete search history.

(56) References Cited

U.S. PATENT DOCUMENTS 6,442,525 B1 * 8/2002 Silverbrook et al. ........... 705/1

2002/0082989 A1 * 6/2002 Fife et al. ..................... 705/39

FOREIGN PATENT DOCUMENTS

| JP | 08-030494 | 2/1996 |
| JP | 11-510660 | 9/1999 |
| JP | 2001-014189 | 1/2001 |
| JP | 2003-157185 | 5/2003 |
| JP | 2003-188905 | 7/2003 |

OTHER PUBLICATIONS

Takashi Horikawa; "System Performance Evaluation with Hybrid Measurement Approach"; Information Processing Society Research Report; Mar. 16, 1991; vol. 91(28) (OS-50); pp. 81-87.

* cited by examiner

Primary Examiner—Karl D. Frech
(74) Attorney, Agent, or Firm—Dickstein Shapiro LLP (57) ABSTRACT

A system for generating a transaction profile includes a communication status analyzer, a consumed resource quantity analyzer, an analyzer for analyzing an association between a processing group and a process, an analyzer for analyzing consumed resource quantities and communication quantities for respective processing groups, a transaction profile generator, and a transaction profile.

8 Claims, 6 Drawing Sheets

Fig. 1 (Prior Art)

| Index values | times at which events occurred | event types | process IDs | own port numbers | companion addresses | companion port numbers | data sizes |
|---|---|---|---|---|---|---|---|
| 1 | t1 | resume | web | – | – | – | – |
| 2 | t2 | receive | – | 443 | client | Xc | Pcw |
| 3 | t3 | send | – | Xw | local | 8080 | Pwa |
| 4 | t4 | save | web | – | – | – | – |
| 5 | t5 | resume | ap | – | – | – | – |
| 6 | t6 | receive | – | 8080 | local | Xw | Pwa |
| 7 | t7 | send | – | Xa | local | 5432 | Pad |
| 8 | t8 | save | ap | – | – | – | – |
| 9 | t9 | resume | db | – | – | – | – |
| 10 | t10 | receive | – | 5432 | local | Xa | Pad |
| 11 | t11 | send | – | 5432 | local | Xa | Pda |
| 12 | t12 | save | db | – | – | – | – |
| 13 | t13 | resume | ap | – | – | – | – |
| 14 | t14 | receive | – | Xa | local | 5432 | Pda |
| 15 | t15 | send | – | 8080 | local | Xw | Paw |
| 16 | t16 | save | ap | – | – | – | – |
| 17 | t17 | resume | web | – | – | – | – |
| 18 | t18 | receive | – | Xw | local | 8080 | Paw |
| 19 | t19 | send | – | 443 | client | Xc | Pwc |
| 20 | t20 | save | web | – | – | – | – |

| Index values | process IDs 1 | own port numbers 1 | companion port numbers 2 | process IDs 2 |
|---|---|---|---|---|
| 1 | web | 443 | Xc | external |
| 2 | web | Xw | 8080 | ap |
| 3 | ap | 8080 | Xw | web |
| .. | ap | Xa | 5432 | db |
| N | db | 5432 | Xa | ap |

Fig. 7

| processing groups | process IDs |
|---|---|
| Cweb | web |
| Cap | ap |
| Cdb | db |

Fig. 8

| processing groups | process IDs | CPU consumption quantities | received data sizes 1 | sent data sizes 1 | sent data sizes 2 | received data sizes 2 |
|---|---|---|---|---|---|---|
| Cweb | web | CPUweb | Pcw (against client) | Pwc (against client) | Pwa (against ap) | Paw (against ap) |
| Cap | ap | CPUap | Pwa (against web) | Paw (against web) | Pad (against db) | Pda (against db) |
| Cdb | db | CPUdb | Pad (against ap) | Pda (against ap) | | |

Fig. 9

SYSTEM, METHOD, AND PROGRAM FOR GENERATING TRANSACTION PROFILE FOR MEASURING AND ANALYZING COMPUTER SYSTEM PERFORMANCE

BACKGROUND OF THE INVENTION

1. Field of the Invention

The present invention relates to a system for generating a transaction profile in a computer system performance measuring and analyzing system, a method of generating a transaction profile using such a system for generating a transaction profile, and a program for performing such a method of generating a transaction profile.

2. Description of the Related Art

Figure 1:
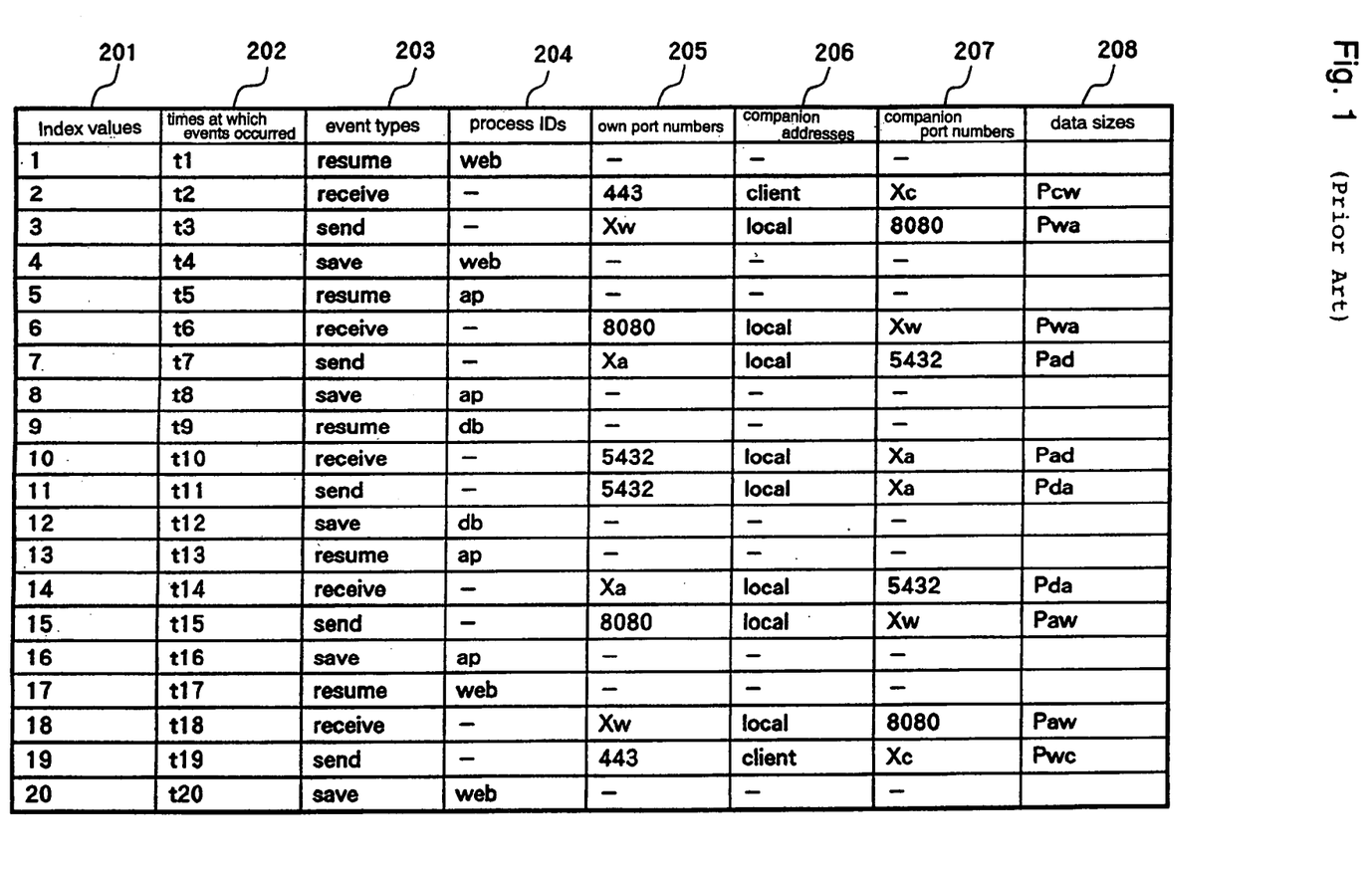
FIG. 1 is a diagram showing a table of event trace data.

Computer system performance is analyzed by a conventional computer system performance measuring and analyzing system according to the following process (see Japanese laid-open patent publication No. 2003-157185 and "Measurement and analysis of system operation using a hybrid monitoring process", Information Processing Society Research Report, Mar. 16, 1991, Vol. 91, No. 28 (OS-50), p. 81–87). 1) A measuring probe is embedded in the software of a computer to be measured. 2) A program to be measured is executed. 3) A profile generator analyzes the performance using, as input data, event trace data generated as a result of the program sequence. Details of event trace data are shown in FIG. 1 of the accompanying drawings.

The profile generator performs the following two types of tabulating operation using process switching events (events "resume" and "save" in FIG. 1): 1) The difference between a time (e.g., t4 in FIG. 1) when an event "save" occurs and a time (e.g., t1 in FIG. 1) when a corresponding event "resume" occurs is determined to calculate a CPU consumption time for the process run in the time zone (the process "web" in the time zone t1–t4 in FIG. 1), and such CPU consumption times are tabulated. 2) Since communication events (e.g., an event "receive" occurring at time t2 and an event "send" occurring at time t3 in the time zone t1–t4) occurring between an event "save" (e.g., t4 in FIG. 1) and an event "resume" (e.g., t1 in FIG. 1) mean communications that are performed by the process run in the time zone (the process "web" in the time zone t1–t4 in FIG. 1), data sizes for respective communication paths (each uniquely determined by a combination of its own port number, the companion address, and the companion port number) of communications performed by the process are tabulated. These tabulating operations make it possible to obtain figures on consumed resource quantities (CPU consumption times) and figures on communications (transmitted data sizes and received data sizes for respective communication paths) for respective processes.

According to the conventional event tracing analysis, however, in order to obtain transaction information (figures on consumed resource quantities and communications) about transaction processing required for a system performance simulation based on figures tabulated for respective processes, it is necessary to 1) identify processes with respect to the transaction processing and 2) check and tabulate profiles about the processes with respect to the transaction processing.

If a transaction is processed by software components as a plurality of program parts, then in order to perform a simulation on the assumption that the software components are placed in different servers, profiles need to be tabulated for a set of processes (processing group) involved in the processing of the transaction with the software components.

To meet such a need, it is necessary to 1) identify processes involved in the processing (i.e., designate names or process numbers of those processes) and 2) determine an association between those processes and processing groups.

The above practice is possible if all computer programs used by a system are self-made products, and software components and execution statuses are recognized. However, if commercially available package software and self-made software are combined into a system, as practiced at present, then it would be difficult and not practical to attain detailed information about components and execution statuses of package software. According to the conventional practice, therefore, it is difficult to make a detailed analysis of loaded locations with respect to each component and only insufficient information is available for optimizing system performance.

SUMMARY OF THE INVENTION

It is an object of the present invention to provide a system for generating a transaction profile in a computer system performance measuring and analyzing system, a method of generating a transaction profile using such a system for generating a transaction profile, and a program for performing such a method of generating a transaction profile, to be able to classify processes involved in transaction processing into processing groups and calculate profiles with respect to the respective processing groups simply by designating a process serving as a starting point of the transaction processing.

According to the present invention, there is provided a system for generating a transaction profile in a computer system performance measuring and analyzing system, from communication event trace data sampled by a measuring probe incorporated in a computer to be measured, using a port number table containing a first Index value as a unique identifier, a port number used for communications of a process by the computer, and a processing group for classifying therein a process involved in transaction processing, comprising a communication status analyzer having means for generating, from the communication event trace data, a table of extracted communication events which contains a second Index value as a unique identifier, a process ID for identifying a process with which the computer has communicated, an own port number as a port number used by the process to send data, a companion address as an address number of a computer which runs a companion process with which the process has communicated, and a companion port number as a port number used by the companion process to receive data, a consumed resource quantity analyzer having means for calculating and holding a period of time from the occurrence of an event "resume" to the occurrence of an immediately succeeding event "save" for each the process, as a CPU consumption quantity, an analyzer for analyzing an association between a processing group and a process, having means for processing the table of extracted communication events to generate a communication relation table containing, as representing an analyzed communication relation, a third Index value as a unique identifier, a first process ID for identifying the process which has sent data, an own port number used by the process identified by the first process ID to send data, a second process ID for identifying a companion process which receives data, and a companion port number used by the process identified by the second process ID to receive data, an analyzer for analyzing consumed resource quantities and communication quantities for respective processing groups, having means for calculating a CPU consumption quantity for each process which is held by the consumed resource quantity analyzer, and a sent data size and a received data size with respect to communications performed from the occurrence of the event "resume" to the occurrence of the event "save" for each process, and holding the set of the sent data size and the received data size and data representing, as identifiers, the own port number and the companion port number for each process, as a consumed resource quantity and a communication quantity for each process, and means for comparing the own port number and the companion port number in the communication relation table with the port number in the port number table, and, if either one of the own port number and the companion port number agrees with the port number in the port number table, holding the consumed resource quantity and communication quantity of a process referred to by the third index value of the own port number or the companion port number in the communication relation table, as the consumed resource quantities and communication quantities of the processing group referred to by the first index value in the port number table, and recording an association between the processing group and the process in a table of processing groups and processes associated therewith, and a transaction profile generator having means for outputting profiles of the CPU consumption quantity, the sent data size, and the received data size tabulated for each process, as transaction profiles tabulated for each processing group.

According to the present invention, there is also provided a program for enabling a computer or a microprocessor to function as the above system for generating a transaction profile.

According to the present invention, there is further provided a method of generating a transaction profile using a system for generating a transaction profile in a computer system performance measuring and analyzing system, from communication event trace data sampled by a measuring probe incorporated in a computer to be measured, using a port number table containing a first Index value as a unique identifier, a port number used for communications of a process by the computer, and a processing group for classifying therein a process involved in transaction processing, the system comprising a communication status analyzer, a consumed resource quantity analyzer, an analyzer for analyzing an association between a processing group and a process, an analyzer for analyzing consumed resource quantities and communication quantities for respective processing groups, and a transaction profile generator, the method comprising the steps of causing the communication status analyzer to generate, from the communication event trace data, a table of extracted communication events which contains a second Index value as a unique identifier, a process ID for identifying a process with which the computer has communicated, an own port number as a port number used by the process to send data, a companion address as an address number of a computer which runs a companion process with which the process has communicated, and a companion port number as a port number used by the companion process to receive data, causing the consumed resource quantity analyzer to calculate and hold a period of time from the occurrence of an event "resume" to the occurrence of an immediately succeeding event "save" for each the process, as a CPU consumption quantity, causing the analyzer for analyzing an association between a processing group and a process to process the table of extracted communication events to generate a communication relation table containing, as representing an analyzed communication relation, a third Index value as a unique identifier, a first process ID for identifying the process which has sent data, an own port number used by the process identified by the first process ID to send data, a second process ID for identifying a companion process which receives data, and a companion port number used by the process identified by the second process ID to receive data, causing the analyzer for analyzing consumed resource quantities and communication quantities for respective processing groups to calculate a CPU consumption quantity for each process which is held by the consumed resource quantity analyzer, and a sent data size and a received data size with respect to communications performed from the occurrence of the event "resume" to the occurrence of the event "save" for each process, and to hold the set of the sent data size and the received data size and data representing, as identifiers, the own port number and the companion port number for each process, as a consumed resource quantity and a communication quantity for each process, and means for comparing the own port number and the companion port number in the communication relation table with the port number in the port number table, and, if either one of the own port number and the companion port number agrees with the port number in the port number table, to hold the consumed resource quantity and communication quantity of a process referred to by the third index value of the own port number or the companion port number in the communication relation table, as the consumed resource quantities and communication quantities of the processing group referred to by the first index value in the port number table, and to record an association between the processing group and the process in a table of processing groups and processes associated therewith, and causing the transaction profile generator to output profiles of the CPU consumption quantity, the sent data size, and the received data size tabulated for each process, as transaction profiles tabulated for each processing group.

In the above method, the step of causing the analyzer for analyzing an association between a processing group and a process to process the table of extracted communication events to generate a communication relation table, comprises the steps of 1) referring to the second index value as a unique identifier in rows of the table of extracted communication events, as i, and setting the value of i in a first row to 1, 2) setting the maximum value of the second index value to N, comparing the second index value i and the second index value N with each other, if the second index value i is smaller than or equal to the second index value N, going to step 3), and if the second index value i is greater than the second index value N, putting the method to an end, 3) referring to the second index value in the table of extracted communication events, as j, and setting the value of j in a first row to 1, 4) setting the maximum value of the second index value to N, comparing the second index value j and the second index value N with each other, if the second index value j is smaller than or equal to the second index value N, going to step 7), and if the second index value j is greater than the second index value N, going to step 5), 5) recording the row i corresponding to the second index value i as an external communication event in the communication relation table, and going to step 6), 6) incrementing the second index value i by 1, and returning to step 2), 7) comparing the own port number in the row i and the companion port number in the row j corresponding to the second index value j with each other, and if the own port number and the companion port number are equal to each other, going to step 9), and if the own port number and the companion port number are not equal to each other, going to step 8), 8) incrementing the second index value j by 1, and returning to step 4), and 9) recording an association between the row i and the row j in the communication relation table, and going to step 6).

In the above method, the step of causing the analyzer for analyzing consumed resource quantities and communication quantities for respective processing groups to record an association between the processing group and the process in the table of processing groups and processes associated therewith, comprises the steps of 1) referring to the third index value as a unique identifier in rows of the communication relation table, as i, and setting the value of i in a first row to 1, 2) setting the maximum value of the third index value to N, comparing the third index value i and the third index value N with each other, if the third index value i is smaller than or equal to the third index value N, going to step 3), and if the third index value i is greater than the third index value N, putting the method to an end, 3) determining whether the own port number in the row i corresponding to the third index value i in the communication relation table and the port number in the row j corresponding to the first index value j as a unique identifier in the rows of the port number table agree with each other or not, as looped based on the value of j, and if the own port number and the port number agree with each other, going to step 4), and if the own port number and the port number do not agree with each other, returning to step 2), 4) classifying the first process which has used the own port number in the row i of the communication relation table to send data into the processing group in the row j of the port number table, giving the first process a unique processing group name, 5) determining whether the own port number in the row i of the communication relation table and the port number in the row j of the port number table agree with each other or not, as looped based on the value of j, and if the own port number and the port number agree with each other, going to step 6), and if the own port number and the port number do not agree with each other, returning to step 2), and 6) classifying the second process which has used the companion port number in the row i of the communication relation table to receive data into the processing group in the row j of the port number table, giving the second process a unique processing group name, and returning to step 2).

According to the present invention, there is also provided a program for enabling a computer or a microprocessor to perform the above method of generating a transaction profile.

The present invention offers the following advantages:

The system has the communication status analyzer, the consumed resource quantity analyzer, the analyzer for analyzing an association between a processing group and a process, the analyzer for analyzing consumed resource quantities and communication quantities for respective processing groups, and the transaction profile generator, as described above. The system thus constructed is capable of classifying processes involved in transaction processing into processing groups and calculating profiles with respect to the processing groups, simply by designating a process serving as a starting point of the transaction processing. The reasons for the above advantages are as follows:

For software programs that are required to communicate with other components according to TCP, it is generally the customary practice to disclose TCP port numbers used for such communications, and hence it is easy to know TCP port numbers used for communications between software components. For a single computer to perform communications normally, it is necessary for one component to use one port number exclusively. According to the present invention, a series of components making up one transaction, as being joined through communications, can be classified using TCP port numbers as identifiers. Consequently, simply designating a process serving as a starting point of the transaction processing, processes involved in the transaction processing can be classified into processing groups and profiles can be calculated with respect to the processing groups.

Specifically, a transaction made up of software components as a plurality of program parts is measured, and communication events directed to TCP port numbers (well known port numbers) used for communications between those software components are used to separate and tabulate loads for the software components making up the transaction, thereby generating a profile of the transaction.

The above and other objects, features, and advantages of the present invention will become apparent from the following description with reference to the accompanying drawings, which illustrate examples of the present invention.

DETAILED DESCRIPTION OF THE PREFERRED EMBODIMENT

Figure 2:
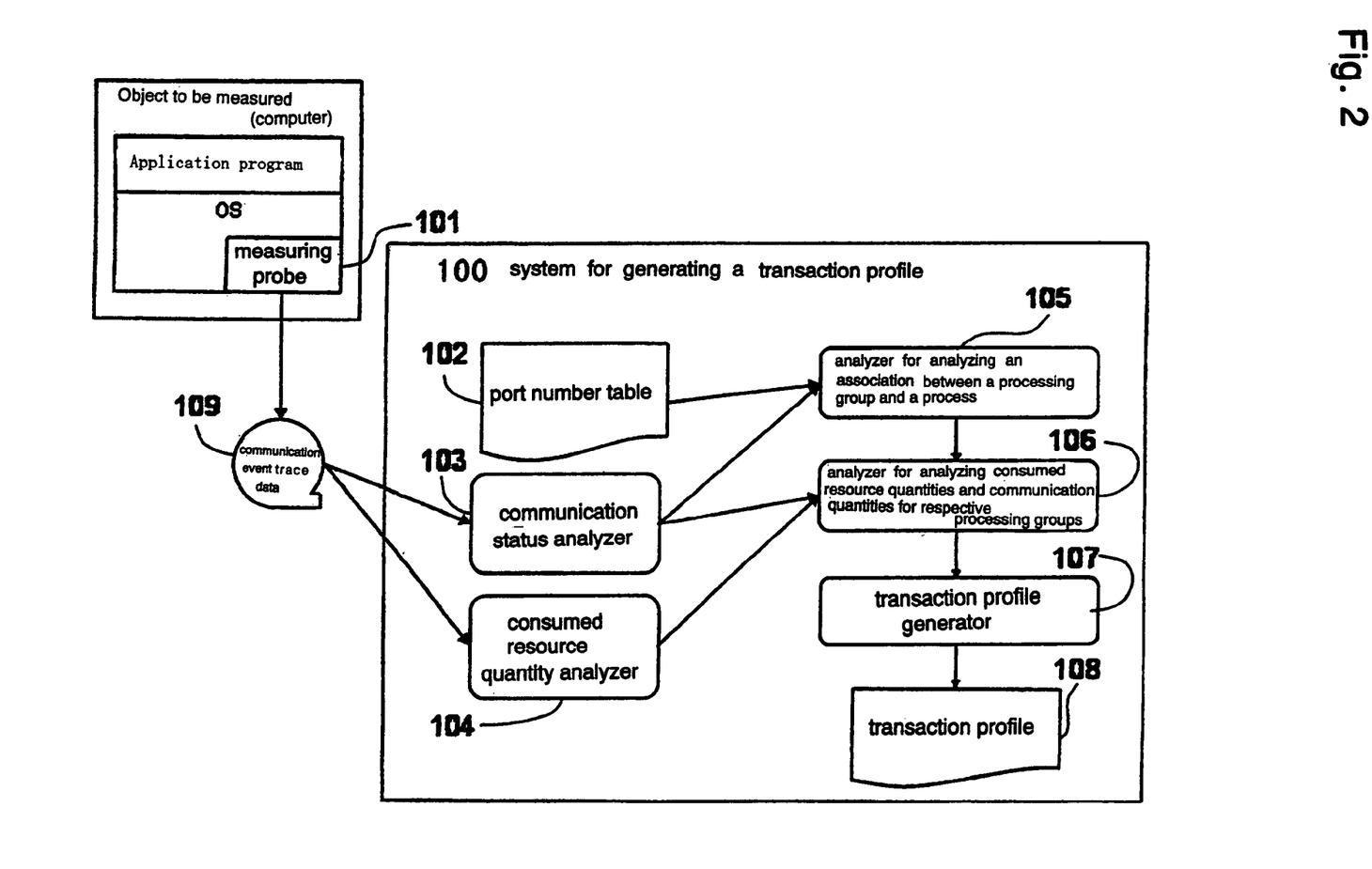
FIG. 2 is a diagram of a system for generating a transaction profile in a computer system performance measuring and analyzing system according to an embodiment of the present invention.

FIG. 2 shows in block form system 100 for generating a transaction profile in a computer system performance measuring and analyzing system. System 100 generates transaction profile 108 using port number table 102 from communication event trace data 109 sampled by measuring probe 101 that is incorporated in a computer to be measured. System 100 comprises communication status analyzer 103, consumed resource quantity analyzer 104, analyzer 105 for analyzing an association between a processing group and a process, analyzer 106 for analyzing consumed resource quantities and communication quantities for respective processing groups, and transaction profile generator 107.

Measuring probe 101 comprises a means having codes for sampling events in a certain area of an operating system (OS) of the computer and a function to record sampled codes. Such a means can be realized by those skilled in the art based on the known technology and the conventional art disclosed in Japanese laid-open patent publication No. 2003-157185 referred to above.

Communication event trace data 109 are sampled by measuring probe 101 and comprise, as shown in FIG. 1, Index values 201 recorded to hold a time sequence of events, times 202 at which events have actually occurred, event types 203, process IDs 204 which have caused events to occur, port numbers (own port numbers) 205 used by the computer to be measured for processes to communicate (send), addresses (companion addresses) 206 of computers which have run companion processes with which the processes have communicated, port numbers (companion port numbers) 207 used by the companion processes to communicate (receive), and data sizes 208 which have actually been transmitted. Own port numbers 205 and companion port numbers 207 may be represented by any identifiers insofar as they are capable of identifying processes that are run by the computers, and may be according to a communication protocol other than TCP. Companion addresses 206 may be represented by any identifiers insofar as they are capable of uniquely identifying computers which have run companion processes with which the processes have communicated, and are not limited to IP addresses, but may be identical to the sender's address.

Figure 3:
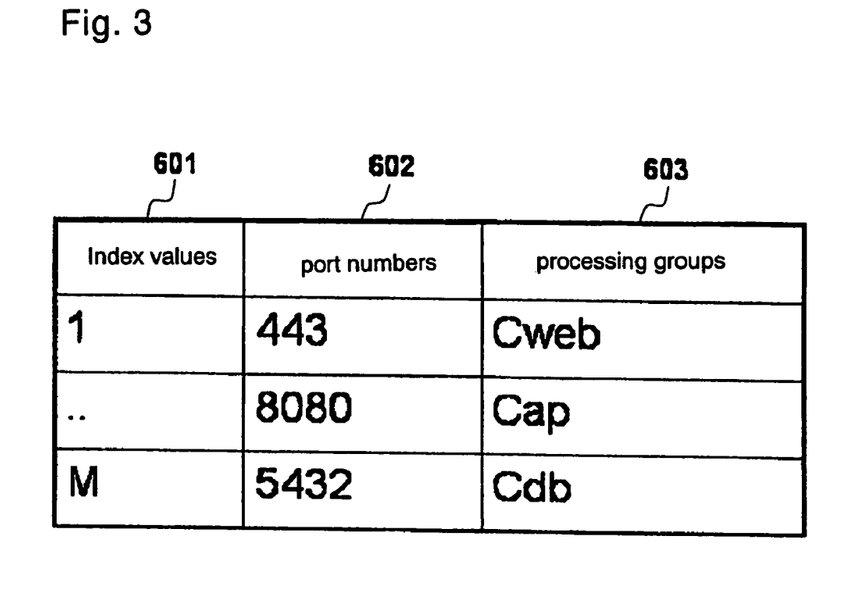
FIG. 3 is a diagram showing a port number table.

As shown in FIG. 3, port number table 102 contains Index values 601 as unique identifiers, port numbers 602, and processing groups 603.

Figure 4:
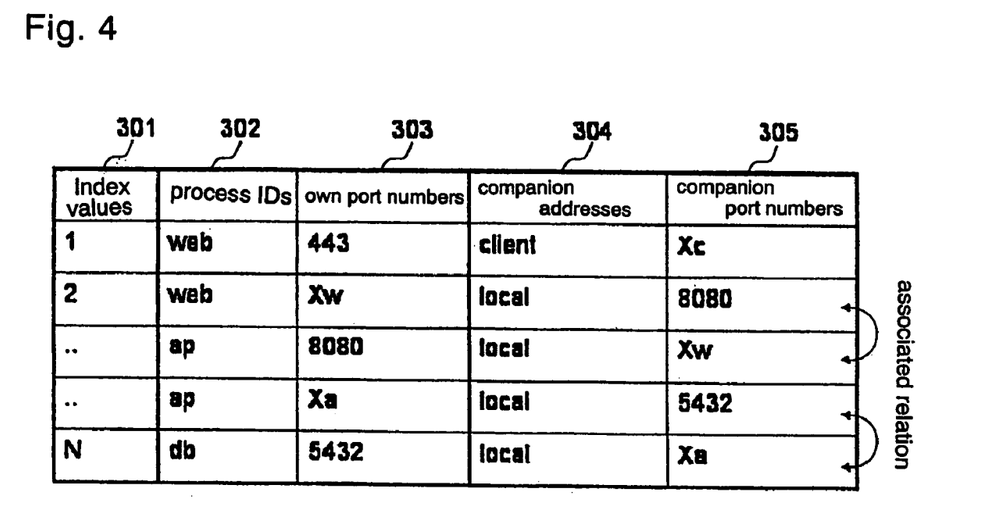
FIG. 4 is a diagram showing a table of extracted communication events.

Communication status analyzer 103 generates a table of extracted communication events as shown in FIG. 4 from event trace data 109. The table of extracted communication events contains Index values 301 as unique identifiers, process IDs 302 for identifying processes which have communicated, own port numbers 303, companion addresses 304, and companion port numbers 305. Process IDs 302, own port numbers 303, companion addresses 304, and companion port numbers 305 are extracted from the table shown in FIG. 1, and hence have the same meanings and data attributes as the table shown in FIG. 1.

Consumed resource quantity analyzer 104 comprises a means for calculating, as a CPU consumption time, a period of time from the occurrence of an event "resume", as indicated by event types 203 in FIG. 1, to the occurrence of an immediately succeeding event "save" for each of process IDs 204 in FIG. 1, and a function to hold the calculated CPU consumption time. In the example shown in FIG. 1, consumed resource quantity analyzer 104 calculates a period of time from the event "resume" represented by Index=1 to the event "save" represented by Index=4, i.e., the period of time t4–t1, as a CPU consumption time during the process ID=web.

Figure 5:
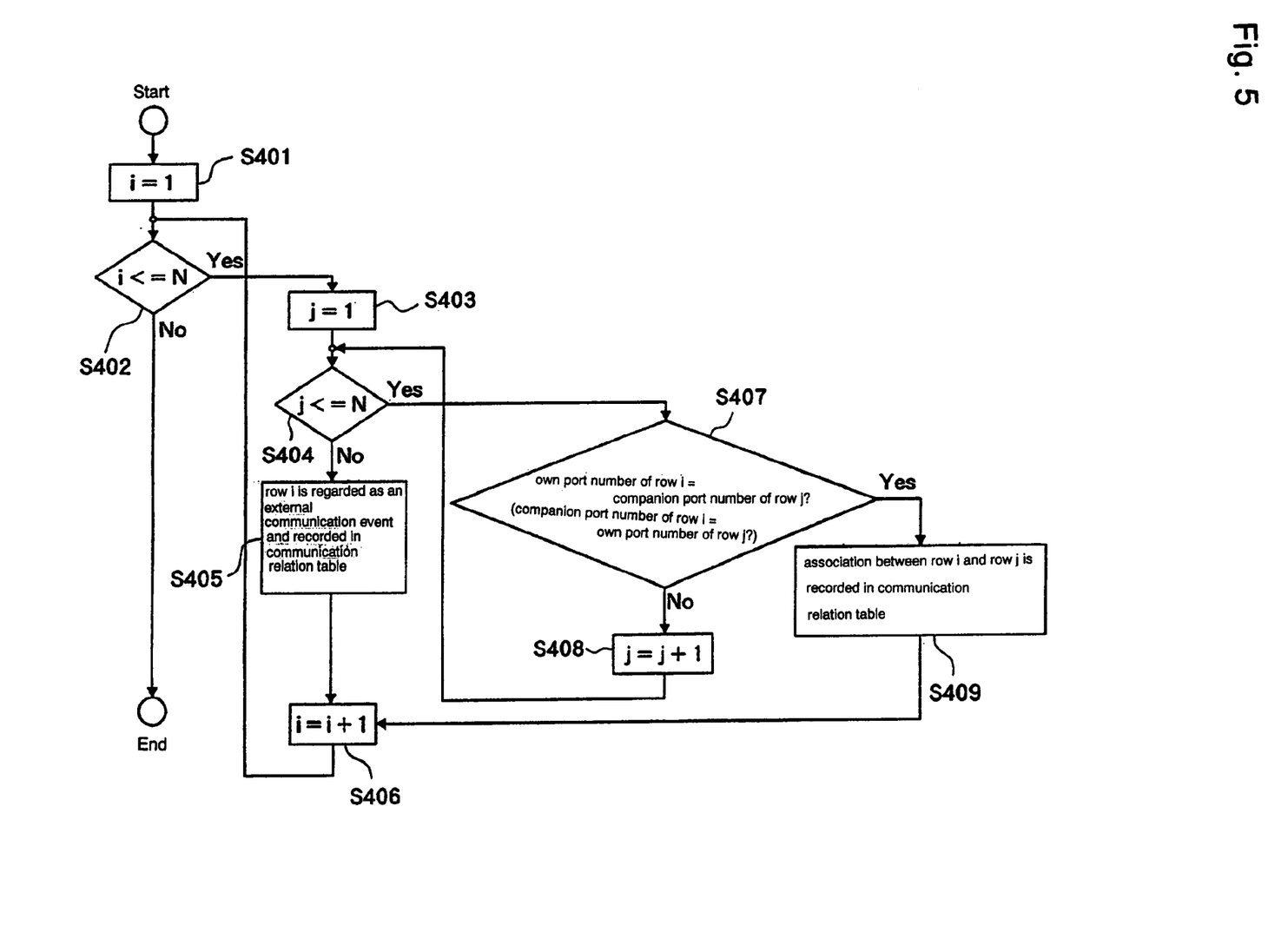
FIG. 5 is a flowchart of a process of generating a communication relation table from the table of extracted communication events.
Figure 6:
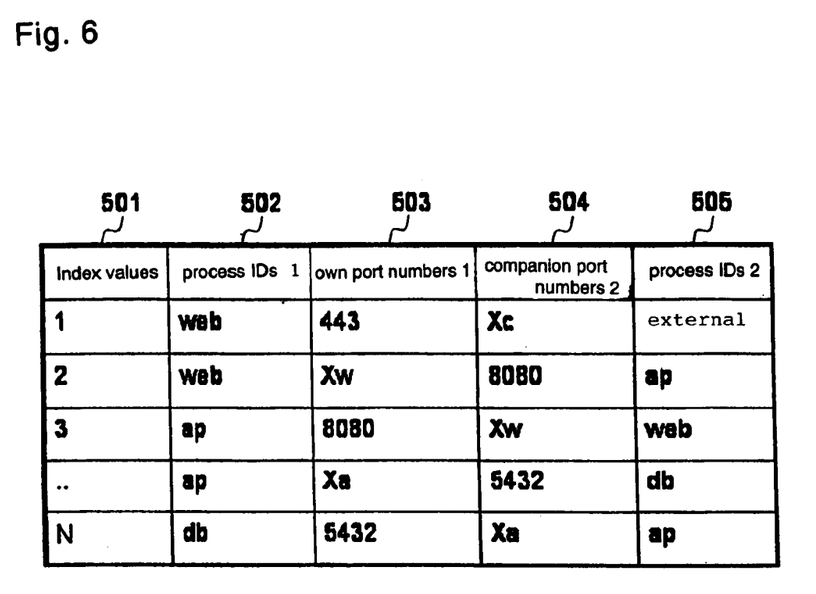
FIG. 6 is a diagram showing the communication relation table.

Analyzer 105 for analyzing an association between a processing group and a process has a function to perform a process shown in FIG. 5 on the table of extracted communication events shown in FIG. 4 to generate a communication relation table shown in FIG. 6 which represents an analyzed communication relation. The communication relation table shown in FIG. 6 contains Index values 501 as unique identifiers, process IDs 502 for identifying processes which have communicated (sent), port numbers (own port numbers) 1 503 used by processes to communicate (send), port numbers (companion port numbers) 2 504 used by companion processes to communicate (receive), and process IDs 2 505 representative of the processes.

Figure 7:
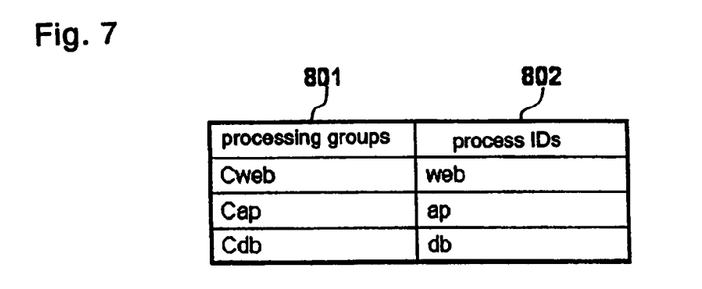
FIG. 7 is a diagram showing a table of processing groups and processes associated therewith.

Analyzer 106 for analyzing consumed resource quantities and communication quantities for respective processing groups has a means for calculating CPU consumption quantities for respective processes that are held by consumed resource quantity analyzer 104, and a sent data size and a received data size with respect to communications that have been carried out from the occurrence of an event "resume" to the occurrence of an event "save", as with the CPU consumption quantities for the respective processes shown in FIG. 1, and holding the set of two data and data representing, as identifiers, an own port number and a companion port number for each process in the communication relation table as consumed resource quantities and communication quantities for each process. Analyzer 106 also has a function to compare the own port number and the companion port number with port numbers described in the port number table shown in FIG. 3, and, if either the own port number or the companion port number agrees with one of the port numbers in the port number table, to hold the consumed resource quantity and communication quantity of the process referred to by the Index value of the own port number or the companion port number in the communication relation table, as consumed resource quantities and communication quantities of the processing group referred to by the Index value. If own port number 1 503 and port number 602 agree with each other, then analyzer 106 regards process DI 1 502 referred to by Index value 501 at the time as processing group 603 referred to by Index value 601 at the time, and records their associated relation in a table of processing groups and processes associated therewith as shown in FIG. 7. Similarly, analyzer 106 has a function to, if companion port number 2 504 and port number 602 agree with each other, a set of process ID 2 505 referred to by Index value 501 at the time and processing group 603 referred to by Index value 601 at the time, as an analyzed result in the table shown in FIG. 7.

Figure 8:
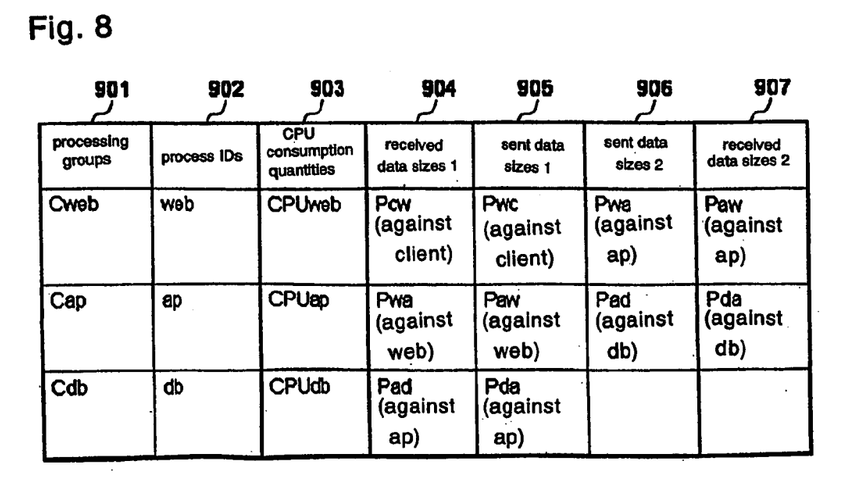
FIG. 8 is a diagram showing a table of transaction profiles tabulated for the respective processing groups.

As shown in FIG. 8, transaction profile generator 107 has a means for outputting profiles of CPU consumption quantities 903, sent data sizes 905, 906, and received data sizes 904, 907 tabulated for respective processes, as transaction profiles tabulated for respective processing groups, according to a particular format depending on the data structure of the transaction profiles.

A process of outputting an analyzed communication relation, of operation of the system according to the embodiment of the present invention, will be described in detail below with reference to FIGS. 4 and 5.

First, Index values 301 serving as unique identifiers in the rows of the table of extracted communication events shown in FIG. 4 are referred to as i, and the value of i in the first row is set to 1 in step S401 shown in FIG. 5. Then, the maximum one of Index values 301 shown in FIG. 4 is set to N, and Index value i and Index value N are compared with each other in step S402. If Index value i is smaller than or equal to Index value N, then control goes to step S403. If Index value i is greater than Index value N, then the process is put to an end. Index values 301 in the table of extracted communication events shown in FIG. 4 are referred to as j, and the value of j for the first row is set to 1 in step S403. Then, the maximum one of Index values 301 shown in FIG. 4 is set to N, and Index value j and Index value N are compared with each other in step S404. If Index value j is smaller than or equal to Index value N, then control goes to step S407. If Index value i is greater than Index value N, then control goes to step S405. In step S405, the row i corresponding to Index value i is regarded as an external communication event and recorded in the communication relation table in FIG. 6, after which control goes to step S406. In step S406, the value of i is incremented by 1, after which control returns to step S402. In step S407, own port number 303 of the row i and companion port number 305 of the row j corresponding to Index value j are compared with each other. If own port number 303 and companion port number 305 are equal to each other, then control goes to step S409. If own port number 303 and companion port number 305 are not equal to each other, then control goes to step S408. Companion port number 305 of the row i and own port number 303 of the row j are similarly compared with each other in step S407. In step S408, the value of j is incremented by 1, after which control returns to step S404. In step S409, the association between the row i and the row j is recorded in the communication relation table shown in FIG. 6, after which control goes to step S406.

A process of analyzing an association between a processing group and a process, of operation of the system according to the embodiment of the present invention, will be described in detail below with reference to FIGS. 3, 6, and 9.

Figure 9:
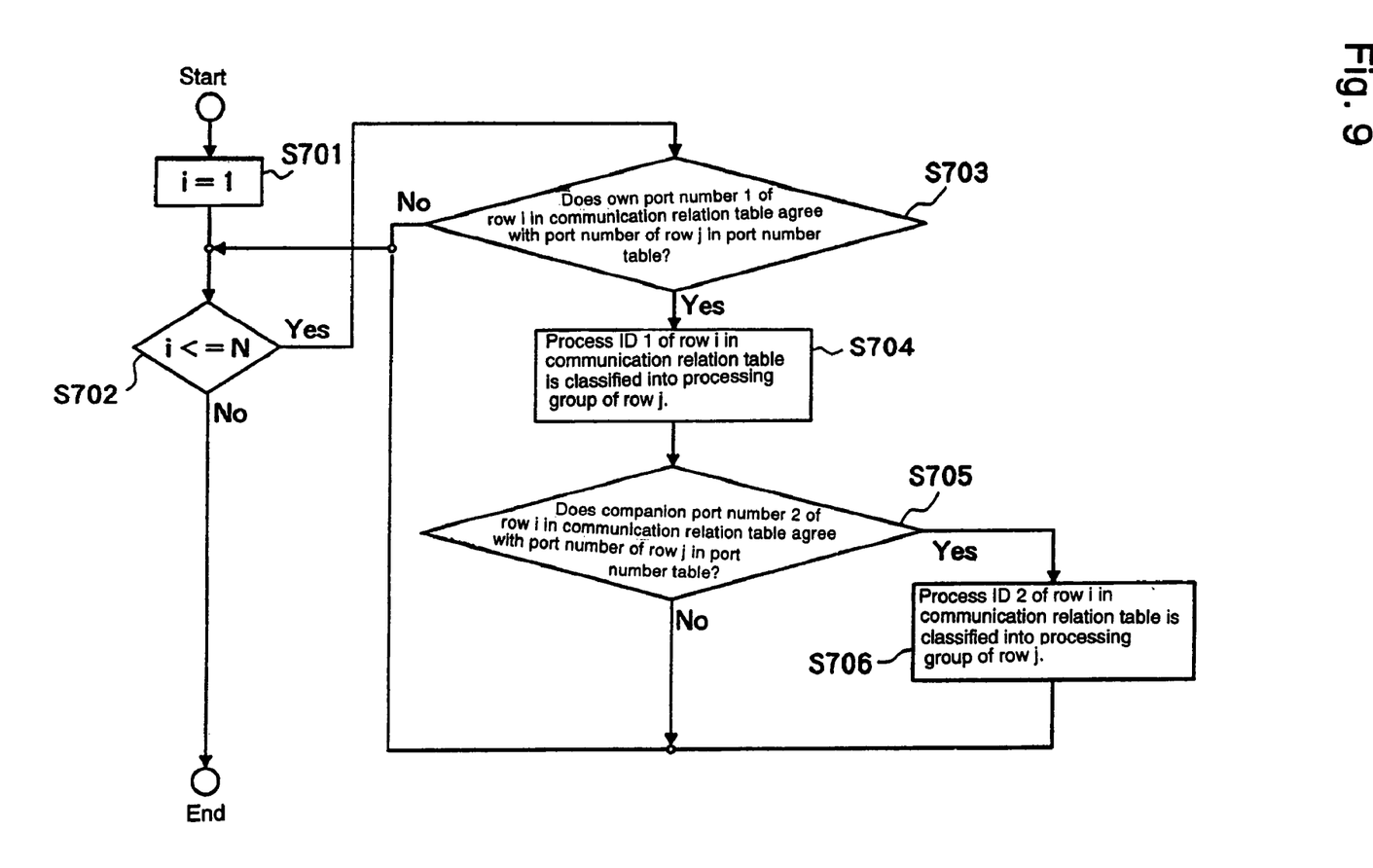
FIG. 9 is a flowchart of a process of analyzing an association between a processing group and a process.

First, Index values 501 serving as unique identifiers in the rows of the communication relation table shown in FIG. 6 are referred to as i, and the value of i in the first row is set to 1 in step S701 shown in FIG. 9. Then, the maximum one of Index values 501 shown in FIG. 6 is set to N, and Index value i and Index value N are compared with each other in step S702. If Index value i is smaller than or equal to Index value N, then control goes to step S703. If Index value i is greater than Index value N, then the process is put to an end. In step S703, it is determined whether own port number 1 503 of the row i corresponding to Index value i in the communication relation table shown in FIG. 6 and port number 602 of the row j corresponding to Index value j which is a unique identifier in the port number table shown in FIG. 3 agree with each other or not. Step S703 is looped based on the value of j. If own port number 1 503 and port number 602 agree with each other, then control goes to step S704. If own port number 1 503 and port number 602 do not agree with each other, then control goes back to step S702. In step S704, process ID 1 502 of the row i in the communication relation table shown in FIG. 6 is classified into processing group 603 of the row j in the port number table shown in FIG. 3, giving itself a unique processing group name. Then, it is determined in step S705 whether companion port number 2 504 of the row i in the communication relation table shown in FIG. 6 and port number 602 of the row j in the port number table shown in FIG. 3 agree with each other or not. Step S705 is looped based on the value of j. If companion port number 2 504 and port number 602 agree with each other, then control goes to step S706. If companion port number 2 504 and port number 602 do not agree with each other, then control goes back to step S702. In step S706, process ID 2 505 of the row i in the communication relation table shown in FIG. 6 is classified into processing group 603 of the row j in the port number table shown in FIG. 3, giving itself a unique processing group name.

According to the above process, in the example shown in FIG. 7, a process with process ID=web is classified into processing group Cweb, a process with process ID=ap is classified into processing group Cab, and a process with process ID=db is classified into processing group Cdb. Transaction profile generator 107 totals profiles tabulated for respective processes according to the classified results, and outputs profiles tabulated for respective processing groups as shown in FIG. 8. The above processes according to the embodiment of the present invention reside in that process IDs are classified according to the information of communication events recorded in the event trace data to derive profiles for respective processing groups without the need for being explicitly supplied with an association between process IDs and processing groups from an external source.

A program representing a method of generating a transaction profile according to the embodiment of the present invention enables a computer or a microprocessor to perform the method of generating a transaction profile.

A program representing a system for generating a transaction profile according to the embodiment of the present invention enables a computer or a microprocessor to function as a system for generating a transaction profile.

While a preferred embodiment of the present invention has been described using specific terms, such description is for illustrative purposes only, and it is to be understood that changes and variations may be made without departing from the spirit or scope of the following claims.

What is claimed is:

1. A system for generating a transaction profile in a computer system performance measuring and analyzing system, from communication event trace data sampled by a measuring probe incorporated in a computer to be measured, using a port number table containing a first Index value as a unique identifier, a port number used for communications of a process by the computer, and a processing group for classifying therein a process involved in transaction processing, comprising:

a communication status analyzer having means for generating, from said communication event trace data, a table of extracted communication events which contains a second Index value as a unique identifier, a process ID for identifying a process with which said computer has communicated, an own port number as a port number used by said process to send data, a companion address as an address number of a computer which runs a companion process with which said process has communicated, and a companion port number as a port number used by said companion process to receive data;

a consumed resource quantity analyzer having means for calculating and holding a period of time from an occurrence of an event "resume" to an occurrence of an immediately succeeding event "save" for each said process, as a CPU consumption quantity;

an analyzer for analyzing an association between a processing group and a process, having means for processing said table of extracted communication events to generate a communication relation table containing, as representing an analyzed communication relation, a third Index value as a unique identifier, a first process ID for identifying said process which has sent data, an own port number used by the process identified by said first process ID to send data, a second process ID for identifying a companion process which receives data, and a companion port number used by the process identified by said second process ID to receive data;

an analyzer for analyzing consumed resource quantities and communication quantities for respective processing groups, having means for calculating a CPU consumption quantity for each process which is held by said consumed resource quantity analyzer, and a sent data size and a received data size with respect to communications performed from the occurrence of the event "resume" to the occurrence of the event "save" for each process, and holding a set of the sent data size and the received data size and data representing, as identifiers, said own port number and said companion port number for each process, as a consumed resource quantity and a communication quantity for each process, and means for comparing the own port number and the companion port number in said communication relation table with the port number in said port number table, and, if either one of the own port number and the companion port number agrees with the port number in said port number table, holding the consumed resource quantity and communication quantity of a process referred to by the third index value of the own port number or the companion port number in said communication relation table, as said consumed resource quantities and communication quantities of the processing group referred to by the first index value in said port number table, and recording an association between said processing group and said process in a table of processing groups and processes associated therewith; and a transaction profile generator having means for outputting profiles of said CPU consumption quantity, said sent data size, and said received data size tabulated for each process, as transaction profiles tabulated for each processing group.

2. A program for enabling a computer or a microprocessor to function as a system for generating a transaction profile according to claim 1.

3. A method of generating a transaction profile using a system for generating a transaction profile in a computer system performance measuring and analyzing system, from communication event trace data sampled by a measuring probe incorporated in a computer to be measured, using a port number table containing a first Index value as a unique identifier, a port number used for communications of a process by the computer, and a processing group for classifying therein a process involved in transaction processing, said system comprising a communication status analyzer, a consumed resource quantity analyzer, an analyzer for analyzing an association between a processing group and a process, an analyzer for analyzing consumed resource quantities and communication quantities for respective processing groups, and a transaction profile generator, said method comprising the steps of:

causing said communication status analyzer to generate, from said communication event trace data, a table of extracted communication events which contains a second Index value as a unique identifier, a process ID for identifying a process with which said computer has communicated, an own port number as a port number used by said process to send data, a companion address as an address number of a computer which runs a companion process with which said process has communicated, and a companion port number as a port number used by said companion process to receive data;

causing said consumed resource quantity analyzer to calculate and hold a period of time from an occurrence of an event "resume" to an occurrence of an immediately succeeding event "save" for each said process, as a CPU consumption quantity;

causing said analyzer for analyzing an association between a processing group and a process to process said table of extracted communication events to generate a communication relation table containing, as representing an analyzed communication relation, a third Index value as a unique identifier, a first process ID for identifying said process which has sent data, an own port number used by the process identified by said first process ID to send data, a second process ID for identifying a companion process which receives data, and a companion port number used by the process identified by said second process ID to receive data;

causing said analyzer for analyzing consumed resource quantities and communication quantities for respective processing groups to calculate a CPU consumption quantity for each process which is held by said consumed resource quantity analyzer, and a sent data size and a received data size with respect to communications performed from the occurrence of the event "resume" to the occurrence of the event "save" for each process, and to hold a set of the sent data size and the received data size and data representing, as identifiers, said own port number and said companion port number for each process, as a consumed resource quantity and a communication quantity for each process, and means for comparing the own port number and the companion port number in said communication relation table with the port number in said port number table, and, if either one of the own port number and the companion port number agrees with the port number in said port number table, to hold the consumed resource quantity and communication quantity of a process referred to by the third index value of the own port number or the companion port number in said communication relation table, as said consumed resource quantities and communication quantities of the processing group referred to by the first index value in said port number table, and to record an association between said processing group and said process in a table of processing groups and processes associated therewith; and causing said transaction profile generator to output profiles of said CPU consumption quantity, said sent data size, and said received data size tabulated for each process, as transaction profiles tabulated for each processing group.

4. A method according to claim 3, wherein said step of causing said analyzer for analyzing an association between a processing group and a process to process said table of extracted communication events to generate a communication relation table, comprises the steps of:

1) referring to the second index value as a unique identifier in rows of said table of extracted communication events, as i, and setting the value of i in a first row to 1;

2) setting a maximum value of said second index value to N, comparing said second index value i and said second index value N with each other, if said second index value i is smaller than or equal to said second index value N, going to step 3), and if said second index value i is greater than said second index value N, putting the method to an end;

3) referring to the second index value in said table of extracted communication events, as j, and setting the value of j in a first row to 1;

4) setting the maximum value of said second index value to N, comparing said second index value j and said second index value N with each other, if said second index value j is smaller than or equal to said second index value N, going to step 7), and if said second index value j is greater than said second index value N, going to step 5);

5) recording the row i corresponding to the second index value i as an external communication event in said communication relation table, and going to step 6);

6) incrementing the second index value i by 1, and returning to step 2);

7) comparing said own port number in the row i and said companion port number in the row j corresponding to the second index value j with each other, and if said own port number and said companion port number are equal to each other, going to step 9), and if said own port number and said companion port number are not equal to each other, going to step 8);

8) incrementing the second index value j by 1, and returning to step 4); and
9) recording an association between the row i and the row j in said communication relation table, and going to step 6).

5. A program for enabling a computer or a microprocessor to perform a method of generating a transaction profile according to claim 4.

6. A method according to claim 3, wherein said step of causing said analyzer for analyzing consumed resource quantities and communication quantities for respective processing groups to record an association between said processing group and said process in the table of processing groups and processes associated therewith, comprises the steps of:
1) referring to the third index value as a unique identifier in rows of said communication relation table, as i, and setting the value of i in a first row to 1;
2) setting the maximum value of said third index value to N, comparing said third index value i and said third index value N with each other, if said third index value i is smaller than or equal to said third index value N, going to step 3), and if said third index value i is greater than said third index value N, putting the method to an end;
3) determining whether said own port number in the row i corresponding to the third index value i in said communication relation table and the port number in the row j corresponding to the first index value j as a unique identifier in the rows of said port number table agree with each other or not, as looped based on the value of j, and if said own port number and the port number agree with each other, going to step 4), and if said own port number and the port number do not agree with each other, returning to step 2);
4) classifying the first process which has used said own port number in the row i of said communication relation table to send data into said processing group in the row j of said port number table, giving the first process a unique processing group name;
5) determining whether said companion port number in the row i of said communication relation table and the port number in the row j of said port number table agree with each other or not, as looped based on the value of j, and if said companion port number and the port number agree with each other, going to step 6), and if said companion port number and the port number do not agree with each other, returning to step 2); and
6) classifying the second process which has used said companion port number in the row i of said communication relation table to receive data into said processing group in the row j of said port number table, giving the second process a unique processing group name, and returning to step 2).

7. A program for enabling a computer or a microprocessor to perform a method of generating a transaction profile according to claim 6.

8. A program for enabling a computer or a microprocessor to perform a method of generating a transaction profile according to claim 3.

* * * * *